United States Patent [19]

Shirai et al.

[11] Patent Number: 5,783,129
[45] Date of Patent: Jul. 21, 1998

[54] APPARATUS, METHOD, AND COATING DIE FOR PRODUCING LONG FIBER-REINFORCED THERMOPLASTIC RESIN COMPOSITION

[75] Inventors: Yoshimitsu Shirai, Shizuoka; Toshikatsu Nitoh, Fuji; Takeshi Amaike, Fuji; Haruji Murakami, Fuji, all of Japan

[73] Assignee: Polyplastics Co., Ltd., Osaka, Japan

[21] Appl. No.: 596,346

[22] PCT Filed: Aug. 17, 1994

[86] PCT No.: PCT/JP94/01364

§ 371 Date: Feb. 16, 1996

§ 102(e) Date: Feb. 16, 1996

[87] PCT Pub. No.: WO95/05280

PCT Pub. Date: Feb. 23, 1995

[30] Foreign Application Priority Data

Aug. 17, 1993 [JP] Japan .................... 5-222755

[51] Int. Cl.⁶ .................................................... B29C 47/02
[52] U.S. Cl. .................... 264/136; 156/180; 264/143; 264/171.13; 264/171.23; 425/112; 425/114; 425/382.3; 425/461
[58] Field of Search ............... 264/171.13, 171.23, 264/141, 143, 136, 137; 156/180; 425/461, 114, 112, 382.3, 466, 462

[56] References Cited

U.S. PATENT DOCUMENTS

| | | | |
|---|---|---|---|
| 2,734,224 | 2/1956 | Winstead | 425/461 |
| 3,323,941 | 6/1967 | Van Dijk . | |
| 3,551,255 | 12/1970 | Ragetlli . | |
| 3,706,216 | 12/1972 | Weingarten | 425/461 |
| 3,825,645 | 7/1974 | Fayet | 425/461 |
| 4,017,240 | 4/1977 | Nelson | 425/461 |
| 4,563,140 | 1/1986 | Turecek | 425/114 |
| 4,588,538 | 5/1986 | Chung et al. | 264/171.23 |
| 4,883,625 | 11/1989 | Glemet et al. | 264/171.23 |
| 4,937,028 | 6/1990 | Glemet et al. | 264/171.23 |
| 4,990,293 | 2/1991 | Macosko et al. | 425/461 |
| 5,112,206 | 5/1992 | Stewart . | |
| 5,277,566 | 1/1994 | Augustin et al. | 264/171.23 |
| 5,320,679 | 6/1994 | Derezinski et al. | 425/461 |

FOREIGN PATENT DOCUMENTS

| | | | |
|---|---|---|---|
| 0 300 321 A3 | 1/1989 | European Pat. Off. . | |
| 2495053 | 4/1982 | France | 425/461 |
| 2625941 | 7/1989 | France | 425/462 |
| 4133394 | 4/1992 | Germany | 425/462 |
| 63-264326 | 11/1988 | Japan . | |
| 3-272830 | 12/1991 | Japan . | |
| 5-220852 | 8/1993 | Japan | 264/171.23 |

OTHER PUBLICATIONS

International Search Report PCT/JP 94/01363.

*Primary Examiner*—Jeffery R. Thurlow
*Attorney, Agent, or Firm*—Nixon & Vanderhye P.C.

[57] ABSTRACT

Apparatus and methods are provided for producing a long fiber-reinforced thermoplastic resin compositions by initially loosening a continuous fiber bundle by a fiber loosening device so as to form a moving web-like continuous fiber bundle. At least one side of the moving web-like continuous fiber bundle which passes through the die is coated with a thermoplastic resin melt extruded through a slit disposed in the die by an extruder. The slit has substantially the same width as that of the web-like continuous fiber bundle to provide an even supply of the resin melt in the width direction of the web-like continuous fiber bundle. A thermoplastic resin melt is supplied to the slit via a plurality of resin supply paths which are branched successively on the same plane. The resin supply paths are positioned so as to be symmetrically planar with respect to the central axis of the root paths thereof. The web-like continuous fiber bundle is impregnated with the thermoplastic resin melt and can thereafter be shaped to a final product form.

6 Claims, 2 Drawing Sheets

APPARATUS, METHOD, AND COATING DIE FOR PRODUCING LONG FIBER-REINFORCED THERMOPLASTIC RESIN COMPOSITION

TECHNICAL FIELD

The present invention relates to an apparatus and a method for producing a long fiber-reinforced thermoplastic resin composition composed of a thermoplastic resin and fiber bundles. The invention also relates to a die used in the production of composite materials of a thermoplastic resin and fiber bundles, and more particularly, to a coating die used in the production of a long fiber-reinforced thermoplastic resin composition.

BACKGROUND ART

As examples of apparatuses for producing long fiber-reinforced thermoplastic resin compositions, there are coating dies with interior passages. Fiber bundles are passed continuously through the interior passages, while a thermoplastic resin melt is extruded into the passages for coating the fiber bundles. The resin coat is allowed to permeate into the fiber bundles.

Japanese Patent Application Laid-open (kokai) No. 63-264326 discloses a coating die used in the production of thermoplastic resin profiles reinforced with continuous long fibers. Continuous roving fibers are coated with a thermoplastic resin inside the die. FIG. 3 in the present specification is an example of the die used for coating described in that publication. A thermoplastic resin supplied from an extruder to supply tubes 2 and 2' as indicated by arrows $F_1$ and $F_2$ is allowed to pass through slits $S_1$ and $S_2$ for permeating into and coating a roving in its width direction W while the roving is moved in the direction of H.

The coating die disclosed in Japanese Patent Application Laid-open (kokai) No. 63-264326 has the drawback that supply of a resin melt, coating of fiber bundles, and impregnation of fiber bundles tend to become uneven in the width direction of the roving. Moreover, differences in supply pressure and in amount of supply of the resin which is supplied in the width direction of the roving brings about further problems of clogging of the die and breakage of fibers which occurs due to the uneven shear force against the resin generated inside the subsequent forming die.

The present invention was accomplished after careful studies in view of the above problems. It is therefore an object of the present invention to solve the above problems and to provide an apparatus, a method, and a coating die for producing a long fiber-reinforced thermoplastic resin composition.

DISCLOSURE OF THE INVENTION

Accordingly, a first aspect of the present invention is drawn to an apparatus for producing a long fiber-reinforced thermoplastic resin composition characterized in that at least one side of a moving web-like continuous fiber bundle which has undergone fiber-loosening is coated with a thermoplastic resin melt extruded through a slit disposed in the apparatus, the slit having substantially the same width as that of the web and being in communication with a plurality of resin supply paths branched on the same plane. A second aspect of the present invention is drawn to a method for producing a long fiber-reinforced thermoplastic resin composition characterized in that at least one side of a moving web-like continuous fiber bundle which has undergone fiber-loosening is coated with a thermoplastic resin melt extruded through a slit disposed in the apparatus, the slit having substantially the same width as that of the web and being in communication with a plurality of resin supply paths branched on the same plane.

A third aspect of the present invention is drawn to a coating die for producing a long fiber-reinforced thermoplastic resin composition in which at least one of the upper and lower sides of a continuous web-like fiber bundle which has undergone fiber-loosening and which passes through the die is coated with a thermoplastic resin melt extruded through a slit disposed in the apparatus and having substantially the same width as that of the web, characterized in that the slit is in communication with a plurality of resin supply paths branched on the same plane.

A fourth aspect of the present invention is drawn to a coating die for producing a long fiber-reinforced thermoplastic resin composition as described in the third aspect, characterized in that the branched resin supply paths are at least two branches which are symmetrical with respect to a line passing through the center of the die.

A fifth aspect of the present invention is drawn to a coating die for producing a long fiber-reinforced thermoplastic resin composition, characterized in that the resin supply paths branched on the same plane in the fourth aspect of the invention are formed between grooves of split dies when they abut to each other, the split dies being symmetrical with respect to the plane. Hereafter, a description will be given to a typical embodiment of a coating die for producing a long fiber-reinforced thermoplastic resin composition in each aspect of the invention. Hereafter, a description will be given centering on a typical coating die for producing long fiber-reinforced thermoplastic resin compositions of each aspect.

In the coating die for producing long fiber-reinforced thermoplastic resin compositions of the present invention, a resin introduced into a die is extruded through a slit elongated in the width direction of a web-like fiber bundle by branching the flow of a resin melt passing through a resin supply path leading to a slit. Therefore, compared to the method in which a resin is introduced to a slit from one supply port via one supply path, the coating die of the invention provides effects of reducing differences in pressure loss and uneven extrusion in the longitudinal direction of the slit, i.e., in the width direction of a web.

Moreover, the resin supply path starting with one supply port is branched, on the same plane, into at least two branches in a symmetrical manner with respect to a line passing through the center of the die. The number of branching may be increased as needed. Thus, uneven extrusion, in the width direction of a web, of a resin melt supplied through a slit can be suppressed in accordance with the order of branching.

Furthermore, by carving branches in split dies which are in plane symmetry to form branched paths in the die and by assembling the split dies so that the planes of symmetry come together, it is possible to manufacture, with ease, a die of the present invention capable of reducing unevenness of extrusion in the width direction of a web.

Figure 1:
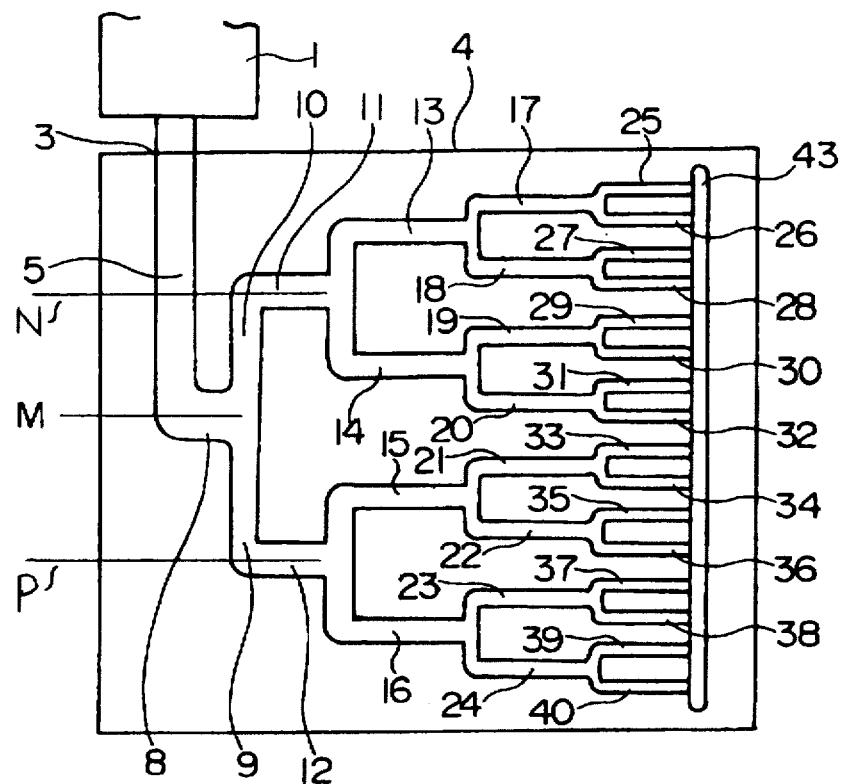
FIG. 1 is a plan view showing a resin supply path of a coating die for producing a long fiber-reinforced thermoplastic resin composition according to one embodiment of the present invention.

Some of essential reference numerals are listed below.
3: Supply port
4: Coating die
5: Path preceding to branches
11, 12: Branched paths
25 through 40: Terminal paths
43: Slit
F: Direction of conveying a web An embodiment of the coating die for producing a long fiber-reinforced thermoplastic resin composition according to the present invention will next be described with reference to the drawings.

Figure 2:
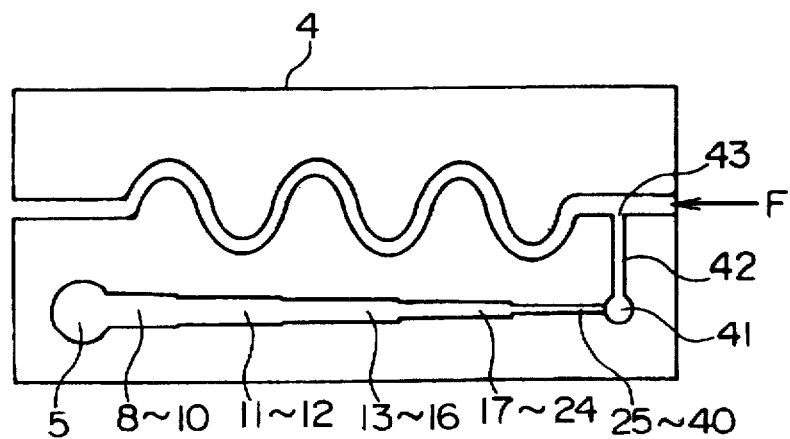
FIG. 2 is a side sectional view of the coating die shown in FIG. 1.

FIG. 1 is a plan view showing the resin supply paths formed in the split dies of the present invention. FIG. 2 shows its side sectional view. In FIG. 1, a thermoplastic resin melt is supplied from an extruder 1 to a supply port 3 of the die. The thermoplastic resin melt introduced into the die 4 is branched to branch paths 9 and 10 which are in a right-and-left symmetry (line, plane) with respect to the central axis M of the die.

The total cross-sectional area of the branch paths 9 and 10 is preferably equal to or slightly smaller than that of the path 5. Also, the lengths of the paths 9 and 10 are preferably equal to each other. The branch path 10 turns its direction to the direction in which the web advances. The branch path 11 further branches to equivalent branch paths 13 and 14 which are in a line and plane symmetry with respect to the central axis of the branch path 11. Similarly, the branch path 12 further branches to equivalent branch paths 15 and 16 which are in a line and plane symmetry with respect to the central axis of the branch path 12.

Thus, the paths 13 and 14 are branched from the path 11 in a symmetrical manner with respect to the central axis N of the path 11. The paths 15 and 16 are branched from the path 12 in a symmetrical manner with respect to the central axis P of the path 12.

In this case, the layouts of the paths 13 and 14 are such that the paths 13 and 16 are in symmetry with respect to the central axis M, and the paths 14 and 15 are in symmetry with respect to the central axis M. The paths 17, 18 branched from the path 13 and terminal paths 25, 26, 27, and 28 branched from the paths 17 and 18 are disposed in symmetry with the paths 19, 20 branched from the path 14 and terminal paths 29, 30, 31, and 32 branched from the paths 19 and 20.

Terminal paths 25, 26, 27, 28, 29, 30, 31, and 32 of their entirety are disposed in line in the longitudinal direction of the slit and in symmetry with the terminal paths 33, 34, 35, 36, 37, 38, 39, and 40 with respect to the central axis M. With this structure, the resin flow, which is symmetrical with respect to each axis, is forwarded with pressure to a slit-like accumulation section 41. As a result, the pressurized resin can be conveyed through a slit-like passage 42 shown in FIG. 2 to a slit 43 in a uniform state in the width direction of the web.

As described above, the resin melt is conveyed under pressure to the slit-like passage 42 via the slit-like accumulation section 41 after it passes through terminal branch paths 25, 26, 27, 28, 29, 30, 31, 32, 33, 34, 35, 36, 37, 38, 39, and 40 shown in FIGS. 1 and 2. When the resin is extruded through the slit 43 to permeate into web-like fiber bundles which are conveyed in the direction as shown by the arrow F in FIG. 2, reduced unevenness in extrusion volume in the direction of the width of the web can be obtained, in other words, extrusion with reduced difference in extrusion pressure of a resin melt can be performed.

Figure 3:
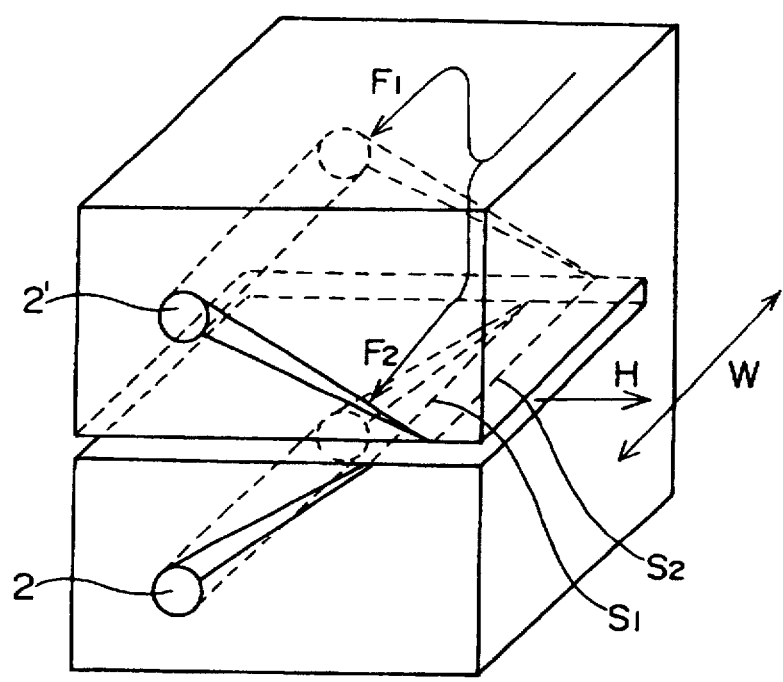
FIG. 3 is a perspective view showing a conventional coating die.

When a continuous web-like fiber bundle is coated with a thermoplastic resin melt, the resin melt may be extruded from above the web or from both the upper and lower sides of the web as shown in FIG. 3, rather than being extruded from beneath the web.

Examples of the thermoplastic resin used for applying to a fibrous web for impregnation include polyolefins such as polyethylene and polypropylene; polyesters such as polyethylene terephthalate and polybutylene terephthalate; polyamides such as nylon 6, nylon 66, nylon 11, nylon 12, nylon 610 and nylon 612; other thermoplastic resins such as polyacetals, polycarbonates, polyurethanes, polyphenylene sulfides, polyphenylene oxides, polysulfones, polyetherketones, polyetheramides, polyetherimides, and combinations of these. The molecular weight of these resins is not particularly limited so long as they exhibit proper fiber-reinforcing effects when permeated into the fibers.

Various additives may be added to the thermoplastic resins in accordance with the end use of the resin composition and conditions under which the resin composition is used. Such additives include anti-oxidants, antistatics, impregnation accelerators, plasticizers, mold releasing agents, fire retardants, fireproofing aids, crystallizing accelerators, colorants, and fillers.

As described above, if the coating die for producing a long fiber-reinforced thermoplastic resin composition of the present invention is used, it is possible to uniformly extrude a resin melt toward a web-like fiber bundle passing through the die via a plurality of branched terminal paths disposed in the width direction of a web.

We claim:

1. An apparatus for producing a long fiber-reinforced theremoplastic resin composition comprising:
   a fiber loosening device which loosens a moving continuous fiber bundle and thereby form a web-like continuous fiber bundle; and
   a coating die which receives the moving continuous fiber bundle loosened by the fiber loosening device, said coating die including a slit having substantially the same width as that of the web-like continuous fiber bundle for coating at least one side of the web-like continuous fiber bundle with a thermoplastic resin melt, wherein
   said coating die includes a plurality of resin supply paths in communication with said slit and branched successively on the same plane, said plurality of resin supply paths being in aligned symmetrically relative to a central axis of root paths thereof, and having a length nearly equal to one another, said resin supply paths being turned in a direction toward an outlet of said slit; and wherein
   said coating die further includes an impregnating device for impregnating the web-like continuous fiber bundle with the thermoplastic resin melt in which a path of the impregnated web-like continuous fiber bundle has a rough surface.

2. A method for producing a long fiber-reinforced thermoplastic resin composition, comprising the steps of:
   (a) loosening a continuous fiber bundle by a fiber loosening device so as to form a moving web-like continuous fiber bundle;
   (b) coating at least one side of the moving web-like continuous fiber bundle which passes through a coating die with a thermoplastic resin melt which is extruded through a slit disposed in the die, the slit having substantially the same width as that of the web-like continuous fiber bundle, and being in communication with a plurality of resin supply paths branched successively on the same plane, the plurality of resin supply paths being in symmetrical alignment with respect to a central axis of root paths thereof and having a length nearly equal to each other and being turned in a direction toward an outlet of the slit;

(c) impregnating the web-like continuous fiber bundle with the resin melt through an impregnating step having a path which has a rough surface, and (d) shaping the impregnated web-like continuous fiber bundle to form a final product.

3. A coating die for producing a long fiber-reinforced thermoplastic resin composition comprising:

a fiber loosening device which loosens a moving continuous fiber bundle and thereby form a web-like continuous fiber bundle; and a coating die which receives the moving continuous fiber bundle loosened by the fiber loosening device, said coating die including a slit having substantially the same width as that of the web-like continuous fiber bundle for coating at least one of the upper and lower sides of the web-like continuous fiber bundle with a thermoplastic resin melt, wherein said coating die includes a plurality of resin supply paths in communication with said slit and branched successively on the same plane, said plurality of resin supply paths being aligned symmetrically relative to a central axis of root paths thereof, and having a length nearly equal to one another, said resin supply paths being turned in a direction toward an outlet of said slit; and wherein said coating die further includes an impregnating device for impregnating the web-like continuous fiber bundle with the thermoplastic resin melt in which a path of the impregnated web-like continuous fiber bundle has a rough surface.

4. A coating die as in claim 3, wherein the branched resin supply paths are at least two branches which are symmetrical with respect to a line passing through the center of the die.

5. A coating die as in claim 4, wherein the resin supply paths which are branched successively on the same plane are formed between grooves machined in slit dies when they abut each other, the slit dies being symmetrical with respect to the plane.

6. An apparatus as in claim 1, wherein the branched resin supply paths are at least two branches which are symmetrical with respect to a line passing through the center of the die.

* * * * *